United States Patent Office.

COLIN M. THOMPSON, OF BROOKLYN, NEW YORK.

GALVANIC BATTERY.

SPECIFICATION forming part of Letters Patent No. 397,526, dated February 12, 1889.

Application filed October 7, 1887. Serial No. 251,752. (No model.)

*To all whom it may concern:*

Be it known that I, COLIN M. THOMPSON, a citizen of the United States, residing at Brooklyn, in the county of Kings and State of New York, have invented certain new and useful Improvements in Galvanic Batteries; and I do hereby declare the following to be a full, clear, and exact description of the invention, such as will enable others skilled in the art to which it appertains to make and use the same.

This invention relates to galvanic batteries.

The object of the invention is to produce a galvanic cell which, while presenting great efficiency, in that it will give high electro-motive force and great quantity, will be comparatively inexpensive.

To this end the invention resides in an improved combination of exciting-fluids and depolarizing agents for primary batteries, consisting of certain chlorides, as exciting-fluids, in connection with chromic acid, the latter being modified to meet the requirements of the combination.

As an illustration of how I carry my invention into effect, I give the following example: For the exciting-fluid to act upon the electro-positive element of my cell (such as zinc, iron, &c.) I employ chloride of magnesium; for the depolarizing agent to act upon the electro-negative element of my battery (such as carbon) I make use of chromic acid. The strength of the latter may be varied considerably, according to the work to be accomplished; but I prefer a solution containing twenty per cent. of crystallized chromic acid in fifty per cent. of water, with thirty per cent. of sulphuric acid to diminish the internal resistance, the sulphuric acid probably also acting gradually to decompose the chloride, thus releasing the chlorine to combine with the zinc. By this combination I obtain a higher voltage and greater ampèrage than I have been able to attain hitherto at the same cost. The crude chloride of magnesium, which is thrown away in large quantities with the residual liquor of salt-pans in the manufacture of common salt, is a cheap source of this ingredient. I do not, however, confine myself to the use of chloride of magnesium, since other chlorides—such as those of potassium or sodium—may be substituted for this with less satisfactory result.

Having thus described my invention, what I claim as new, and desire to secure by Letters Patent, is—

A galvanic battery the electro-positive electrode of which is immersed in a solution of a suitable chloride, preferably chloride of magnesium, for an exciting-fluid, and the electro-negative electrode of which is immersed in a solution of chromic acid with sulphuric acid, preferably a solution containing twenty per cent. of crystallized chromic acid in fifty per cent. of water, with thirty per cent. of sulphuric acid to diminish the interal resistance and act gradually to decompose the chloride and release chlorine to unite with the zinc for a depolarizing agent, substantially as described.

In testimony whereof I affix my signature in presence of two witnesses.

COLIN M. THOMPSON.

Witnesses:
R. G. DYRENFORTH,
W. W. MORTIMER.